US010341473B2

(12) United States Patent
Nguyen et al.

(10) Patent No.: US 10,341,473 B2
(45) Date of Patent: Jul. 2, 2019

(54) MODULAR ELECTRONIC DEVICE CASE WITH ACCESSORIES

(71) Applicant: Essential Products, Inc., Palo Alto, CA (US)

(72) Inventors: Anh Tuan Nguyen, San Mateo, CA (US); David John Evans, V, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/697,437

(22) Filed: Sep. 6, 2017

(65) Prior Publication Data

US 2019/0007535 A1 Jan. 3, 2019

Related U.S. Application Data

(60) Provisional application No. 62/540,003, filed on Aug. 1, 2017, provisional application No. 62/528,357, filed on Jul. 3, 2017.

(51) Int. Cl.
| | |
|---|---|
| *H04M 1/02* | (2006.01) |
| *H01F 7/122* | (2006.01) |
| *H04M 1/18* | (2006.01) |
| *H04M 1/725* | (2006.01) |
| *H04M 1/21* | (2006.01) |
| *H04M 1/04* | (2006.01) |

(52) U.S. Cl.
CPC .......... *H04M 1/0256* (2013.01); *H01F 7/122* (2013.01); *H04M 1/0262* (2013.01); *H04M 1/0279* (2013.01); *H04M 1/185* (2013.01); *H04M 1/72575* (2013.01); *H04M 1/0264* (2013.01); *H04M 1/04* (2013.01); *H04M 1/21* (2013.01)

(58) Field of Classification Search
CPC ....................................................... H04M 1/00
USPC ....................................................... 455/575.1
See application file for complete search history.

(56) References Cited

U.S. PATENT DOCUMENTS

| | | | | |
|---|---|---|---|---|
| 8,560,014 | B1 * | 10/2013 | Hu ....................... | H04M 1/0283 361/679.1 |
| 2011/0192857 | A1 | 8/2011 | Rothbaum et al. | |
| 2012/0329532 | A1 * | 12/2012 | Ko ........................ | H02J 7/0044 455/573 |
| 2013/0088815 | A1 * | 4/2013 | Hu ........................ | G06F 1/1628 361/679.01 |
| 2013/0180879 | A1 * | 7/2013 | O'Dowd ............... | G06F 1/1628 206/521 |
| 2014/0024418 | A1 * | 1/2014 | Hu ........................ | H04M 1/026 455/575.8 |

(Continued)

*Primary Examiner* — Wen W Huang
(74) *Attorney, Agent, or Firm* — Perkins Coie LLP

(57) ABSTRACT

Introduced here is a modular electronic device case with accessories. The modular electronic device case contains at least two parts: a member surrounding four narrow sides of the electronic device, and a detachable member which can attach and detach from the member and/or the electronic device. The detachable member covers a fifth side of the electronic device, such as the backside of the electronic device. The detachable member can include a mechanical or an electronic accessory, such as a pocket, a surface attachment mechanism such as a suction cup, a camera, a battery, an audio port, etc. The accessories can communicate with the electronic device through wireless, or wired means.

30 Claims, 15 Drawing Sheets

(56) References Cited

U.S. PATENT DOCUMENTS

| | | | |
|---|---|---|---|
| 2014/0128132 A1* | 5/2014 | Cox, III | H04B 1/3888 455/575.8 |
| 2014/0200056 A1* | 7/2014 | Liu | H04B 1/3877 455/575.8 |
| 2015/0180527 A1* | 6/2015 | Fathollahi | H04B 1/3888 455/575.8 |
| 2015/0264654 A1* | 9/2015 | Wang | H04W 52/0209 455/522 |
| 2015/0295446 A1* | 10/2015 | Fathollahi | H02J 7/0045 455/573 |
| 2016/0020625 A1* | 1/2016 | Tsou | H02J 7/0044 320/115 |
| 2016/0049980 A1* | 2/2016 | Kim | H04B 1/3888 455/575.8 |
| 2016/0087670 A1* | 3/2016 | Lee | H04M 1/0202 455/575.8 |
| 2016/0134730 A1* | 5/2016 | Lee | H04M 1/026 455/552.1 |

* cited by examiner

MODULAR ELECTRONIC DEVICE CASE WITH ACCESSORIES

CROSS-REFERENCE TO RELATED APPLICATIONS

This application claims priority to the U.S. provisional patent application Ser. No. 62/528,357, filed Jul. 3, 2017; and to the U.S. provisional patent application Ser. No. 62/540,003, filed Aug. 1, 2017, all of which are incorporated herein in their entirety and by this reference thereto.

TECHNICAL FIELD

The present application is related to electronic device cases, and more specifically to modular electronic device cases with accessories.

BACKGROUND

Modern electronic device cases, such as cell phone cases enclose five out of six sides of the electronic device, and provide protection from mechanical damage to the device. The electronic device cases are formed into a single object, without detachable parts, and generally do not contain any electronic accessories.

SUMMARY

Introduced here is a modular electronic device case with accessories. The modular electronic device case contains at least two parts: a member surrounding four narrow sides of the electronic device, and a detachable member which can attach and detach from the member and/or the electronic device. The detachable member covers a fifth side of the electronic device, such as the backside of the electronic device. The detachable member can include a mechanical or an electronic accessory, such as a pocket, a surface attachment mechanism such as a suction cup, a camera, a battery, an audio port, etc. The accessories can communicate with the electronic device through wireless, or wired means.

DETAILED DESCRIPTION

Modular Electronic Device Case With Accessories

Introduced here is a modular electronic device case with accessories. The modular electronic device case contains at least two parts: a member surrounding four narrow sides of the electronic device, and a detachable member which can attach and detach from the member and/or the electronic device. The detachable member covers a fifth side of the electronic device, such as the backside of the electronic device. The detachable member can include a mechanical or an electronic accessory, such as a pocket, a surface attachment mechanism such as a suction cup, a camera, a battery, an audio port, etc. The accessories can communicate with the electronic device through wireless, or wired means.

Figure 1A:
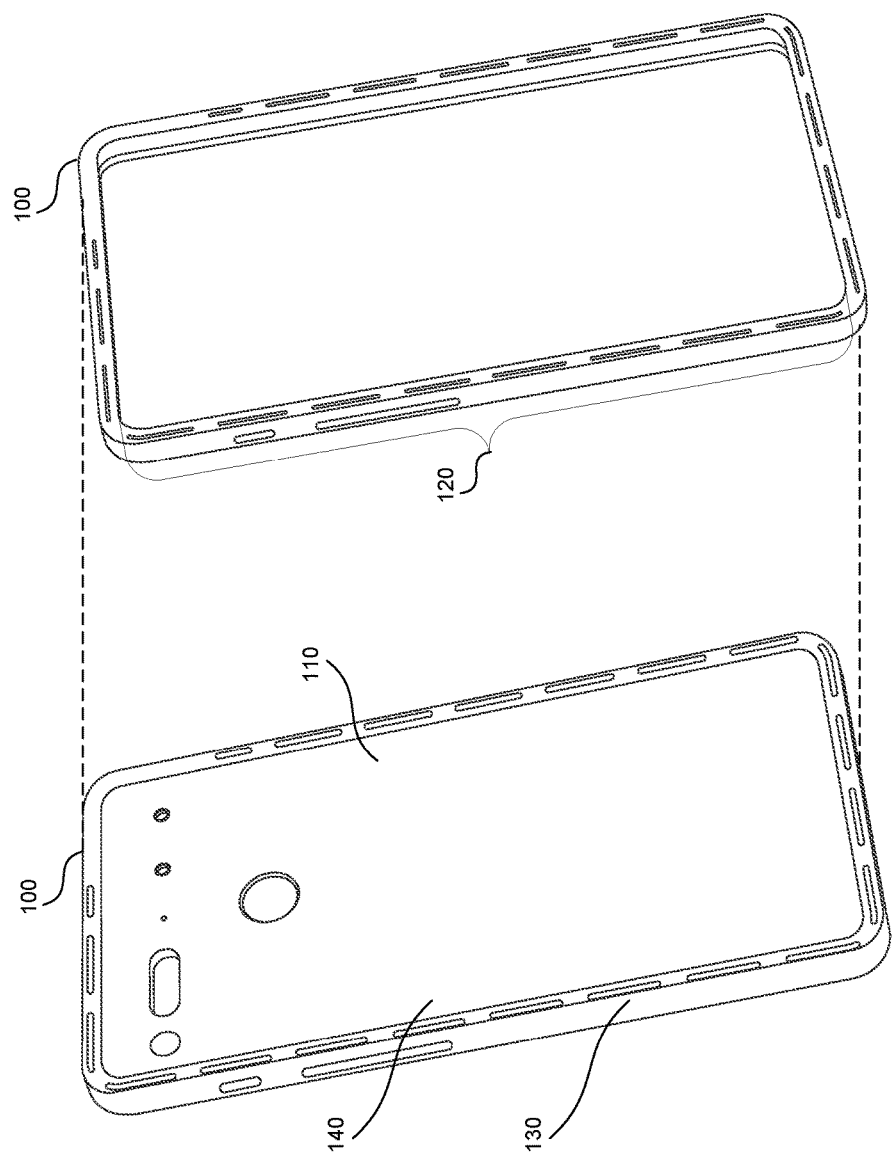
FIGS. 1A-1B show a member, and the member attached to an electronic device, according to various embodiments.
Figure 1B:
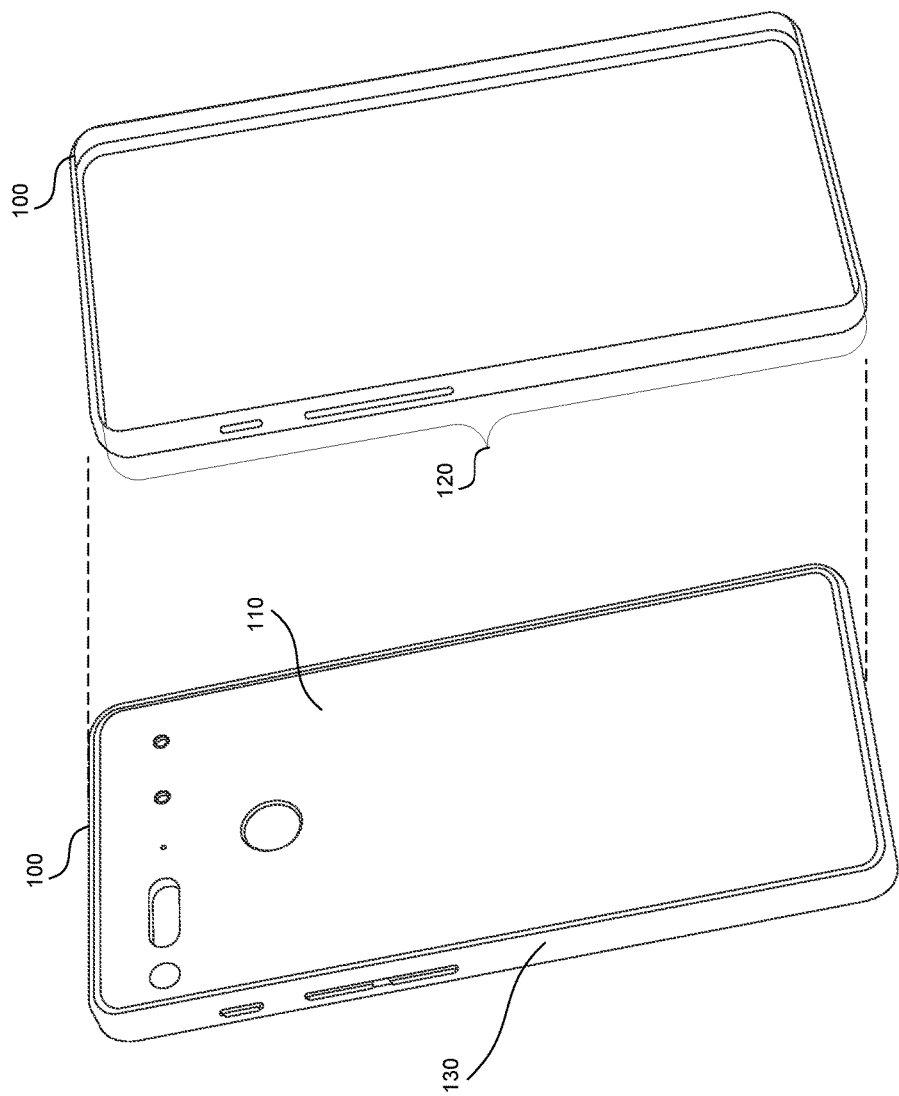

FIGS. 1A-1B show a member, and the member attached to an electronic device, according to various embodiments. The member 100 can be a part of a modular electronic device case. The member 100 can attach to an electronic device 110 along a perimeter 130 of the electronic device 110. A perimeter of a 3-dimensional object, as used in this application, refers to a narrow surface ribbon surrounding a closed curve, where both the narrow surface ribbon and the closed curve are confined to the external surface of the 3-dimensional object. For example, the perimeter 130 of the electronic device 110 can include the narrow sides of the electronic device 110, forming a closed loop. As shown in FIGS. 1A-1B, the member 100 is formed to correspond to the four narrow sides of the six-sided electronic device 110 and to attach to the electronic device 110 by exerting pressure on the electronic device 110. The electronic device 110 can be a cell phone, a tablet, a camera, or any other kind of a mobile device, etc. The member 100 can be a case for the electronic device 110, such as a cell phone case, tablet case, camera case, etc. The member 100 can be made out of various materials such as plastic, titanium, glass, ceramic, etc. The member 100 can be optically opaque, or optically transparent.

As shown in FIG. 1A, the member 100 can extend onto a backside 140 of the electronic device 110, and partially occupy the surface of the backside 140 of the electronic device 110. As shown in FIGS. 1A-1B, the member 100 can be confined to the four narrow sides of the electronic device 110. The electronic device 110 can be shaped as a sphere, an ellipsoid, a prism, etc. The member 100 can attach to an arbitrary perimeter of an arbitrarily shaped electronic device 110, as long as the member 100 does not obscure a display of the electronic device 110.

The member 100 defines a region 120 to accommodate a detachable member. The detachable member can attach to the member 100 or the electronic device 110. The member 100 and the attached detachable member form the modular electronic device case which substantially encloses the electronic device 110 and prevents damage to the electronic device 110.

Figure 2A:
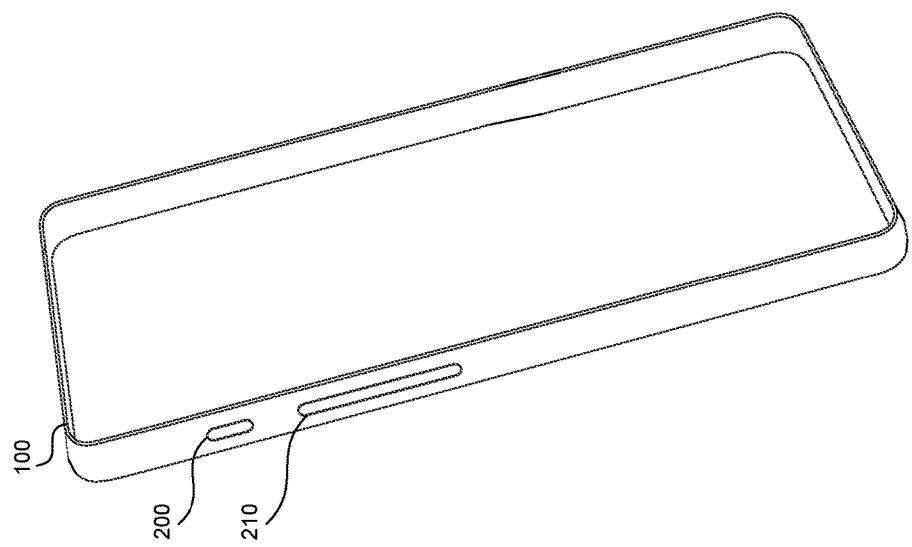
FIGS. 2A-2B show a member, according to various embodiments.
Figure 2B:
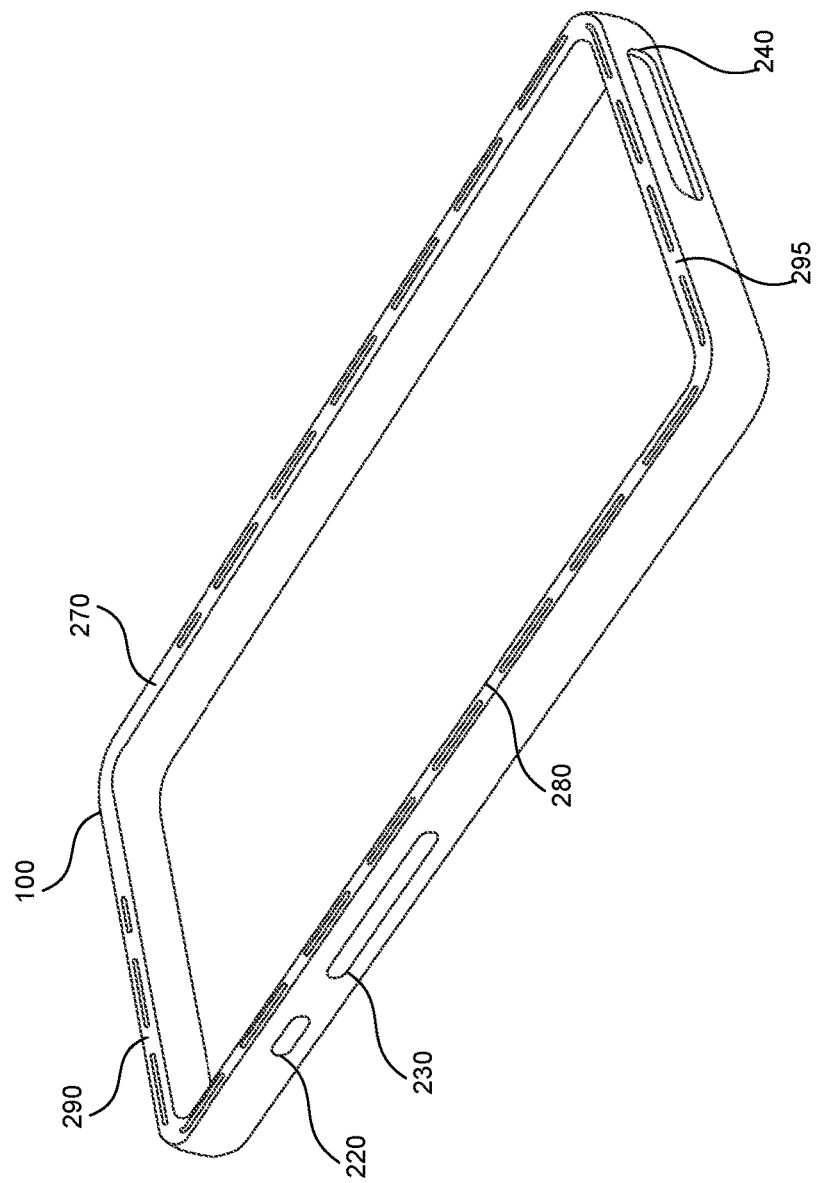

FIGS. 2A-2B show a member, according to various embodiments. In FIG. 2A, the member 100 defines several empty regions 200, 210 through which active regions, such as buttons, associated with the electronic device 110 in FIGS. 1A-1B can be directly accessed by a user. In FIG. 2B, the member 100 defines several filled-in regions 220, 230, which when pressed activate the corresponding active regions, such as buttons, associated with the electronic device 110 in FIGS. 1A-1B. In addition, the member 100 in a single embodiment can include a combination of filled-in regions 220, 230 and an empty region 240, which allows access to ports of the electronic device 110.

Figure 2C:
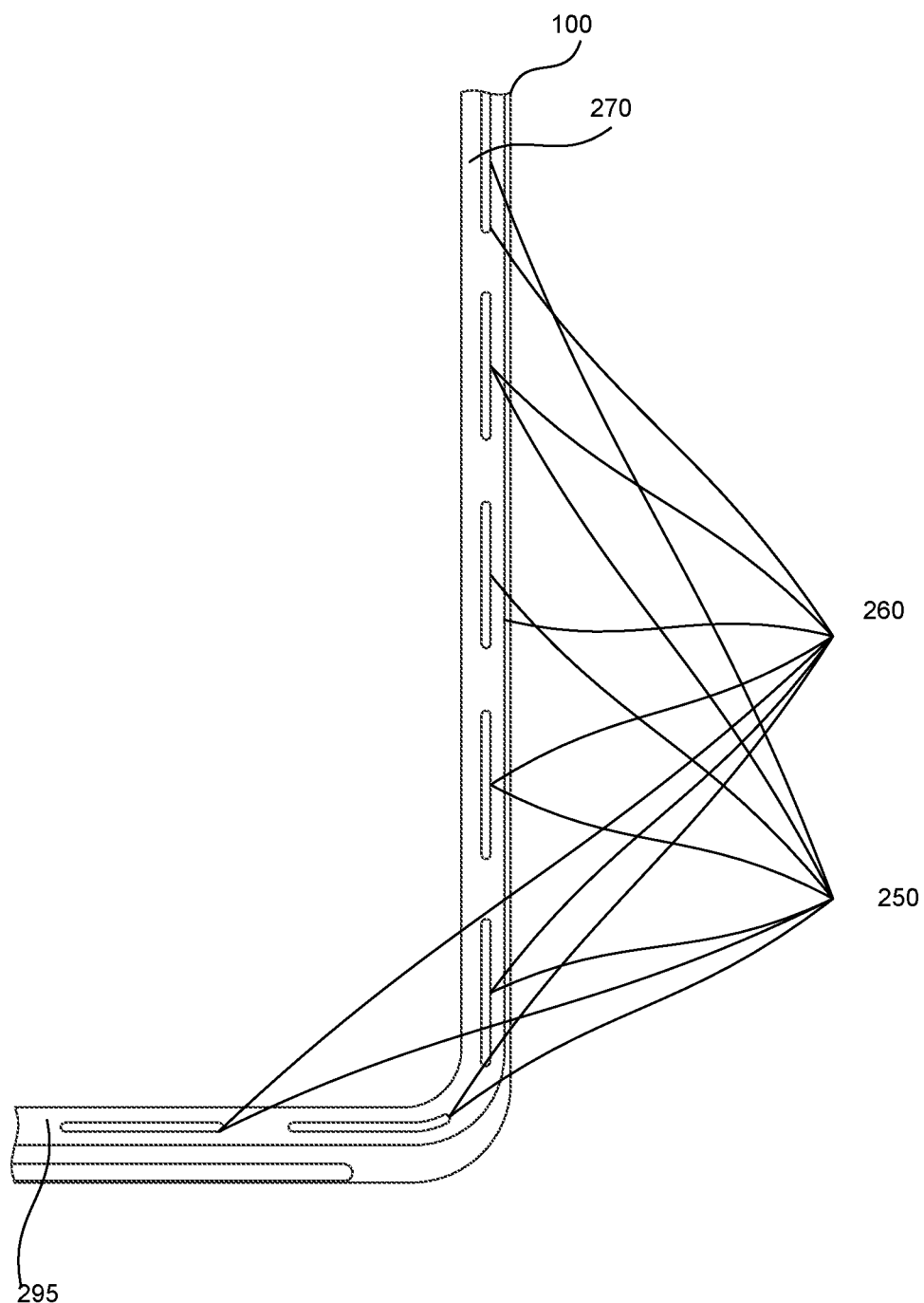
FIG. 2C is a close-up of an attachment mechanism enabling the detachable member to come into contact with the electronic device.

FIG. 2C is a close-up of an attachment mechanism enabling the detachable member to come into contact with the electronic device. The attachment mechanism 250 can include one or more attachment mechanisms built into the member 100, as in FIGS. 1A-1B. The attachment mechanism 250 can also be built into the electronic device 110, as in FIGS. 1A-1B, such as a magnet disposed inside the electronic device 110.

When the attachment mechanism 250 is built into the member 100, the attachment mechanism can include one or more recesses, protrusions, magnets, magnetic material regions, Velcro, clamps, etc., formed within the member 100. Each recess, protrusion, magnet, magnetic material region, etc. can be placed in one or more attachment locations 260. The attachment location 260 can be positioned on the perimeter of the member 100, as shown in FIG. 2C. The perimeter of the member 100 can include the sides 270, 280, 290, 295, shown in FIG. 2B of the member 100. The detachable member has a corresponding attachment mechanism. For example, when the attachment mechanism contains a recess, the corresponding attachment mechanism contains a protrusion at the same location as the recess. In another example, when the attachment mechanism contains a magnet, the corresponding attachment mechanism contains a magnet and/or a magnetic material at the same location as the magnets. The same correspondence can be established for various attachment mechanisms.

When the attachment location 260 includes a recess, each recess receives a corresponding protrusion built into the detachable member, to secure the detachable member to the member 100. When the location 260 includes a magnet, each magnet in the member 100 has a corresponding magnet and/or magnetic material region in the detachable member, to secure the detachable member to the member 100. When the location 260 includes a magnetic material region, each magnetic material region in the member 100 has a corresponding magnet in the additional protective layer to secure additional protective layer to the member 100. When the location 260 includes a protrusion, each protrusion in the member 100 has a corresponding recess in the detachable member to secure the detachable member to the member 100.

There can be multiple attachment locations 260 on each side 270, 280, 290, 295 in FIG. 2B of the member 100, as shown in FIG. 2C. Multiple attachment locations 260 can be spaced at regular intervals along the perimeter of the member 100, shown in FIG. 2C. The multiple attachment locations 260 can be spaced at irregular intervals. In some examples, there can be only one attachment location 260 per each side 270, 280, 290, 295 of the member 100; there can be only one attachment location for the whole member 100; or there can be only one attachment location per long side 270, 280 of the member 100.

Figure 3A:
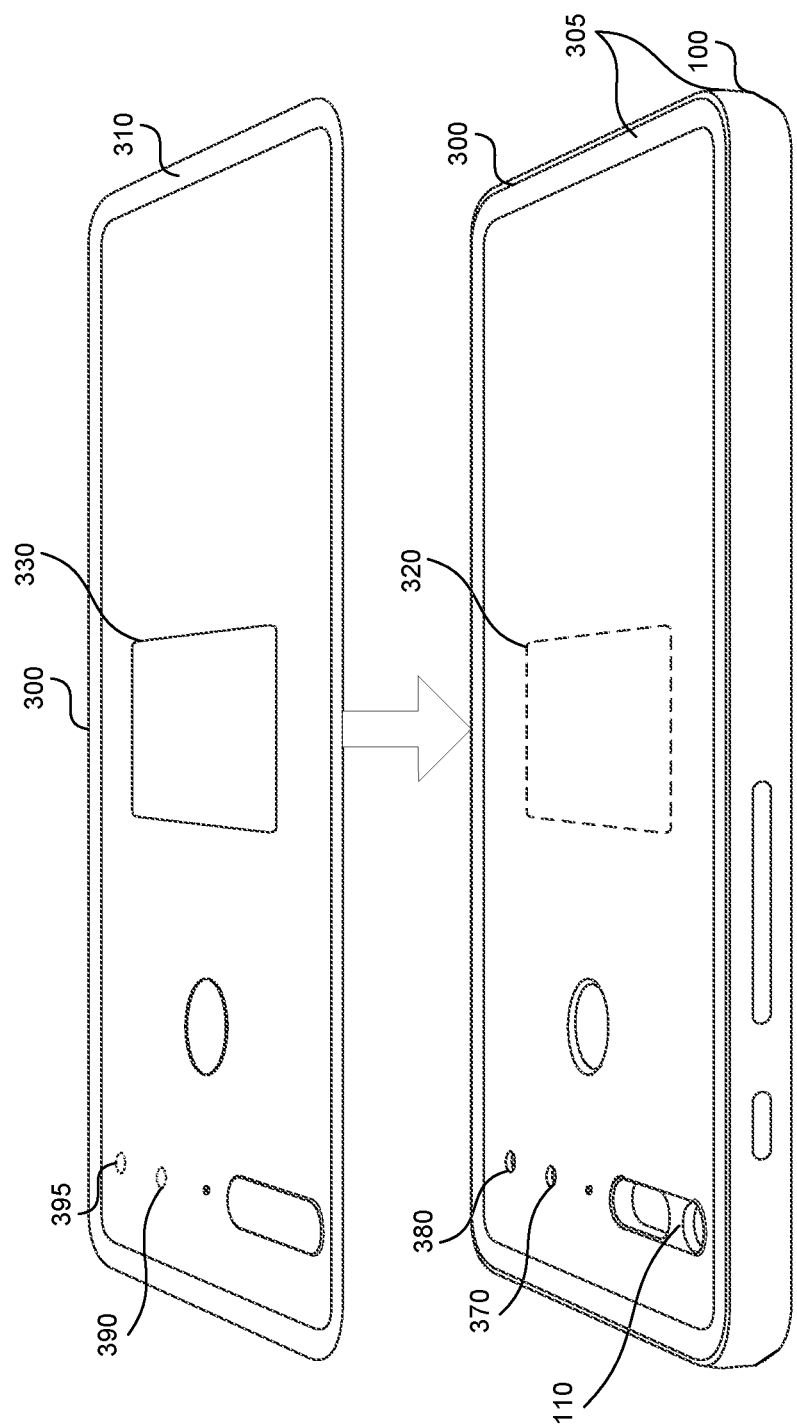
FIG. 3A shows a detachable member, according to various embodiments.

FIG. 3A shows a detachable member, according to various embodiments. The detachable member 300 can attach to the member 100. The detachable member 300 and the member 100 form a modular electronic device case 305. The corresponding attachment mechanism of the detachable member 300 can be disposed within shaded region 310, which forms a perimeter of the detachable member 300. As described in this application, the corresponding attachment mechanism can include magnets, magnetic materials, recesses, protrusions, and/or Velcro, attaching to corresponding magnetic materials, magnets, protrusions, recesses, and/or Velcro associated with the member 100. The member 100 and the detachable member 300 substantially enclose the electronic device and prevent damage to the electronic device 110 when, for example, electronic device 110 is dropped or exposed to harmful substances, such as water.

In addition to, or instead of attaching to the member 100, the detachable member 300 can attach to the electronic device 110 in a predefined region 320 of the electronic device 110. The predefined region 320 can contain a magnet and/or a magnetic material. A corresponding region 330 on the detachable member 300 contains a magnet and/or a magnetic material. The predefined region 320 and the corresponding region 330 attract each other through magnetic forces to secure the detachable member 300 onto the electronic device 110. As shown in FIG. 3A, the detachable member 300 together with the member 100 encloses five of the six sides of the electronic device 110.

The detachable member 300 can also define two regions 390, 395 which can provide access to the recesses 370, 380 in the electronic device 110. The recesses 370, 380 can be electrical contacts allowing an accessory to establish electrical contact with the electronic device 110, or the recesses 370, 380 can be a mechanical attachment mechanism allowing an accessory to mechanically attach to the electronic device 110. The regions 390, 395 can be holes, or they can be movable flaps that, when pressed, move to expose the recesses 370, 380.

Figure 3B:
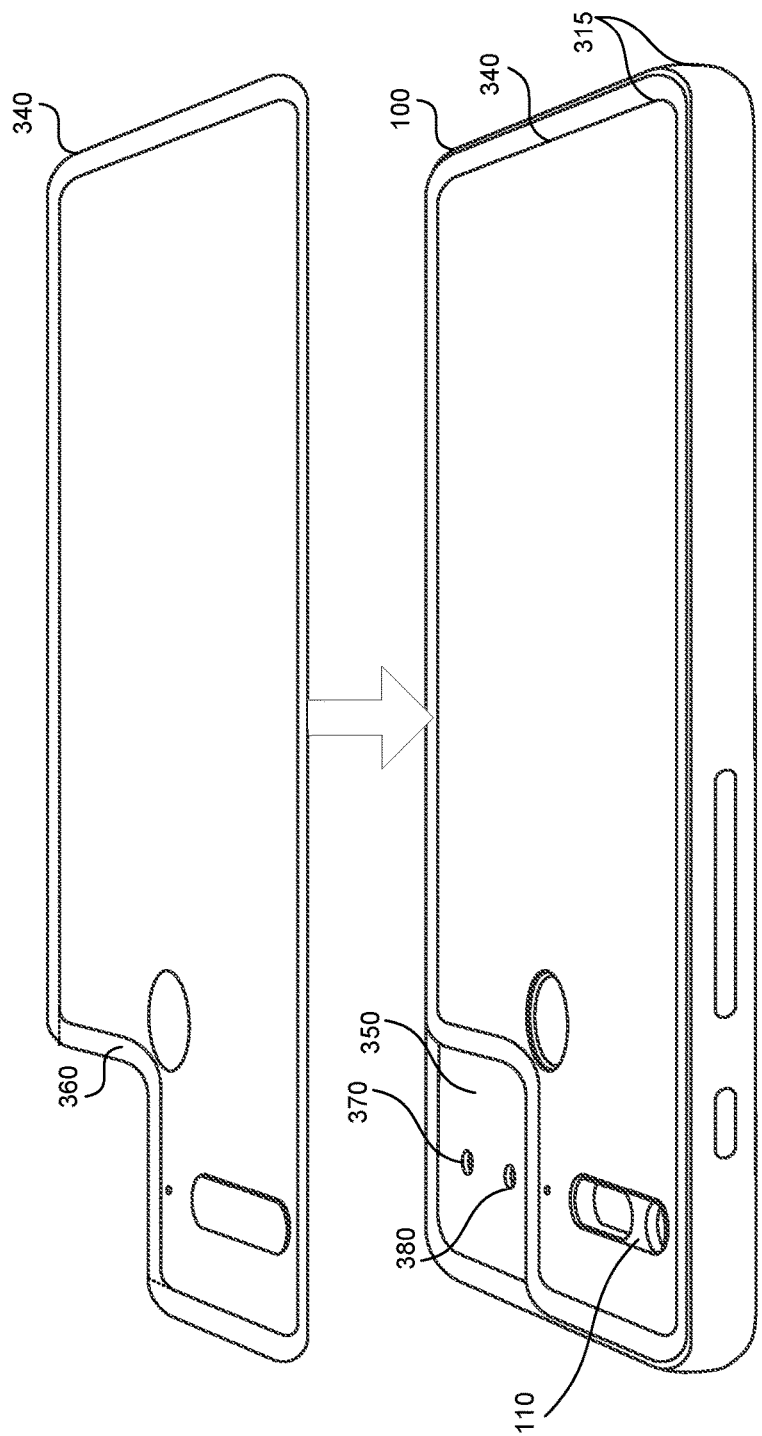
FIG. 3B shows a detachable member shaped around a predefined region of the electronic device.

FIG. 3B shows a detachable member shaped around a predefined region of the electronic device. The detachable member 340 is shaped around the predefined region 350 of the electronic device 110. The detachable member 340 attaches to the electronic device 110 and/or the member 100, as described in this application. The detachable member 340 and the member 100 form a modular electronic device case 315. The predefined region 350 of the electronic device 110 can be a region allowing a wireless magnetic accessory to attach to the electronic device 110. The predefined region 350 can allow wireless communication with the accessory using Bluetooth, wireless USB, and/or extremely high frequencies in the 30 GHz to 300 GHz range. The predefined region 350 can include a magnet and/or a magnetic material enclosed within the electronic device 110. The region 360 disposed on the perimeter of the detachable member 340 can include a magnet and/or a magnetic material which attaches to the magnet and/or the magnetic material enclosed within the electronic device 110, thus securing the detachable member 340 to the electronic device 110.

Figure 4:
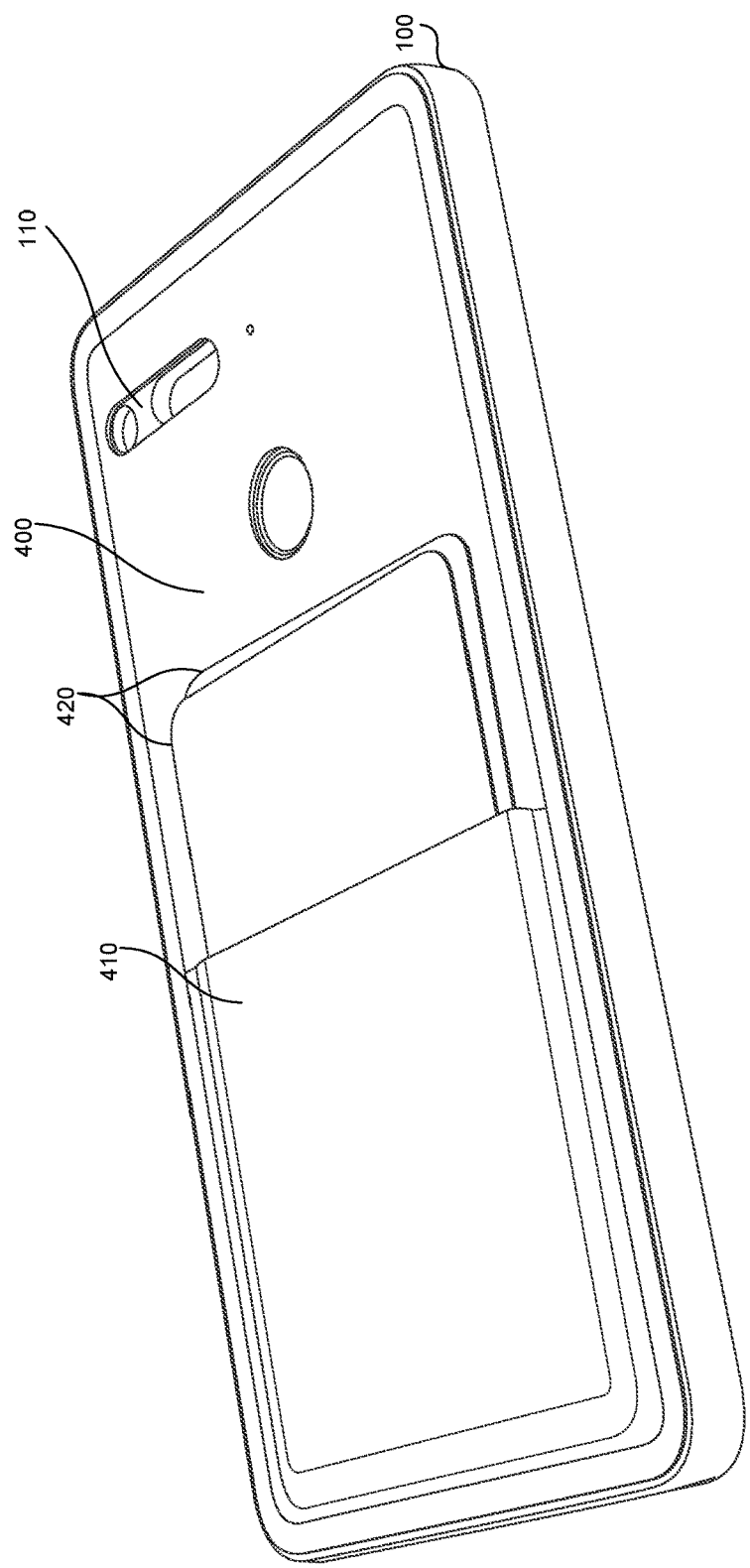
FIG. 4 shows an accessory providing an additional function to the electronic device, according to one embodiment.

FIG. 4 shows an accessory providing an additional function to the electronic device, according to one embodiment. The detachable member 400 attaches to the electronic device 110 and/or the member 100 and contains an accessory 410 which provides the additional function to the electronic device 110. In the present case, the additional function provided is a mechanical additional function. In particular, the additional function is a pocket 410, which can carry thin objects 420, such as cards, money, etc. Cards can be credit cards, insurance cards, identification cards such as a driver's license, membership cards, etc.

Figure 5B:
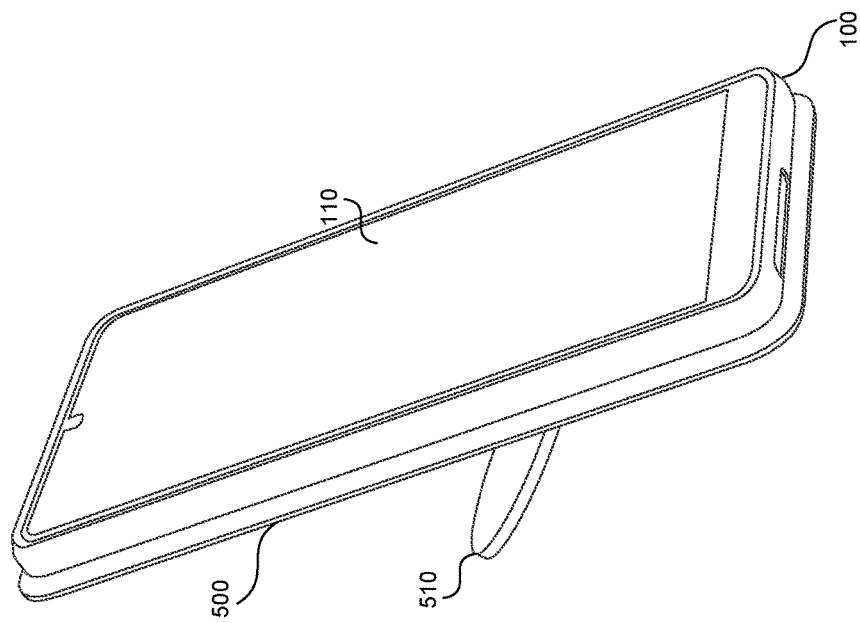
FIG. 5B shows a three-quarter view of the electronic device and the detachable member attached to the electronic device.
Figure 5A:
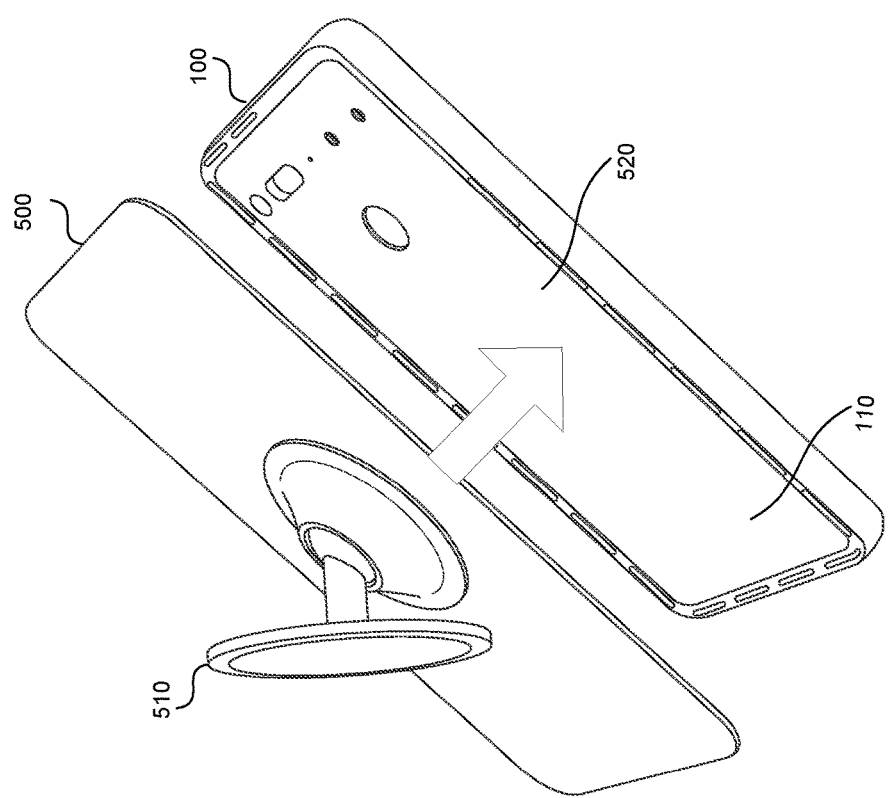
FIG. 5A show an accessory providing an additional function to the electronic device, according to another embodiment.

FIG. 5A show an accessory providing an additional function to the electronic device, according to another embodiment. The detachable member 500 attaches to the electronic device 110 and/or the member 100 and contains an accessory 510 which provides additional function to the electronic device 110. In the present case, the additional function provided is a mechanical function. In particular, the additional functional is an attachment mechanism 510 which can secure the electronic device 110 to an external surface, such as a dashboard of a car, a windshield of a car, a desk, a table, a wall, etc. The attachment mechanism 510 can include a magnet or a magnetic material which can attach to a magnetic material or a magnet on the external surface. The attachment mechanism 510 can be a suction cup, a sticky surface, etc. which can attach the electronic device 110 to the external surface.

FIG. 5B shows a three-quarter view of the electronic device 110 and the detachable member 500 attached to the electronic device 110. As can be seen in FIG. 5B, the detachable member 500 can extend beyond the profile of the electronic device 110 surrounded by the member 100. In other words, the detachable member 500 can be larger than the backside 520 in FIG. 5A of the electronic device 110. The attachment mechanism 510 can be secured to the external surface.

Figure 6:
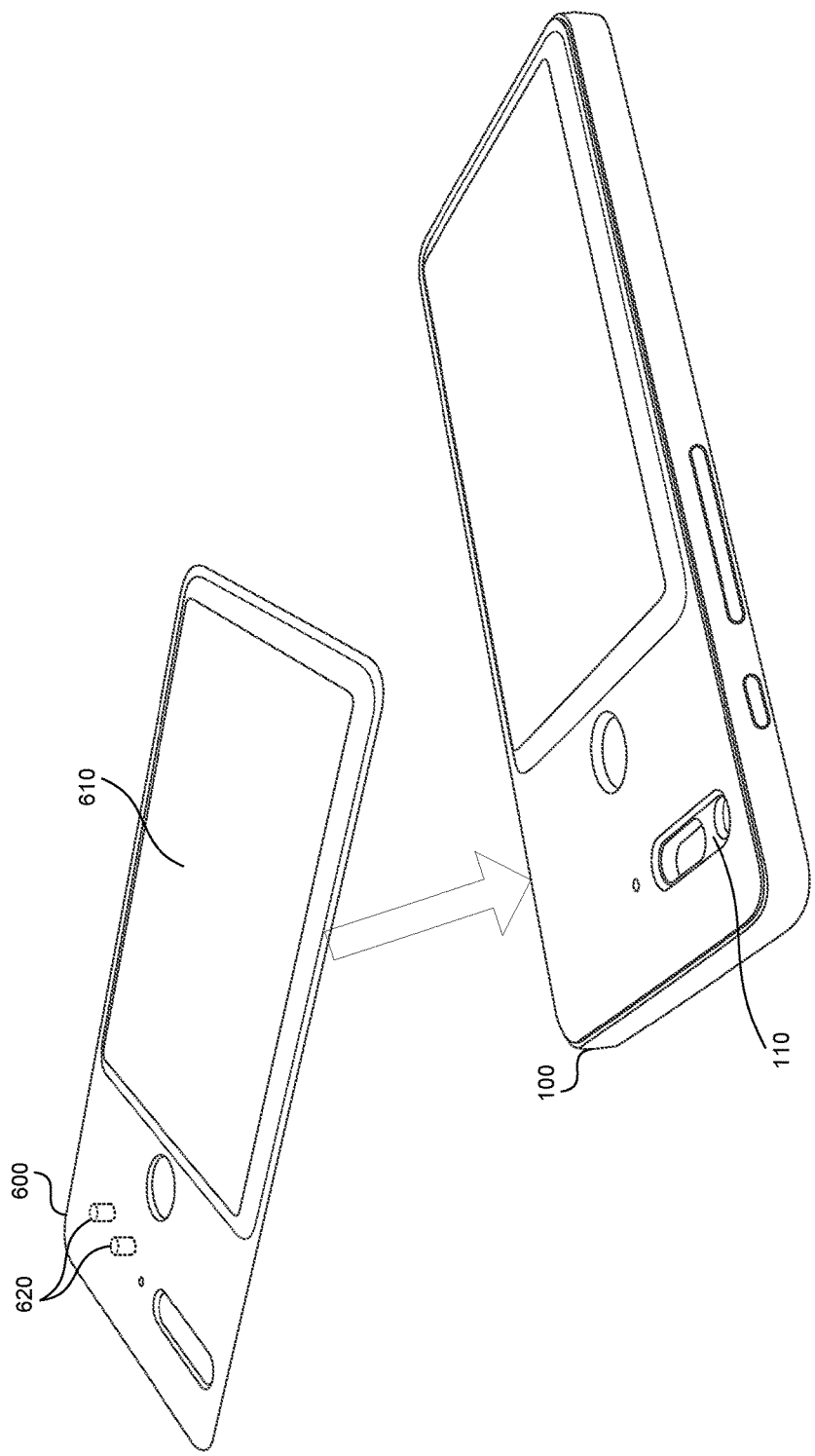
FIG. 6 shows an accessory providing an additional function to the electronic device, according to another embodiment.

FIG. 6 shows an accessory providing an additional function to the electronic device, according to another embodiment. The detachable member 600 attaches to the electronic device 110 and/or the member 100 and contains an accessory 610 which provides additional function to the electronic device 110. In the present case, the additional function provided is an electronic additional function. In particular, the additional functional is an external battery 610 which can provide a source of energy to the electronic device 110. For example, the external battery 610 can charge the internal battery of the electronic device 110, through a wireless or wired charging mechanism. When the charging mechanism is wired, the detachable member 600 can have two electronic protrusions 620 which plug into corresponding recesses, such as recesses 370, 380 in FIG. 3B, on the electronic device 110.

Figure 7:
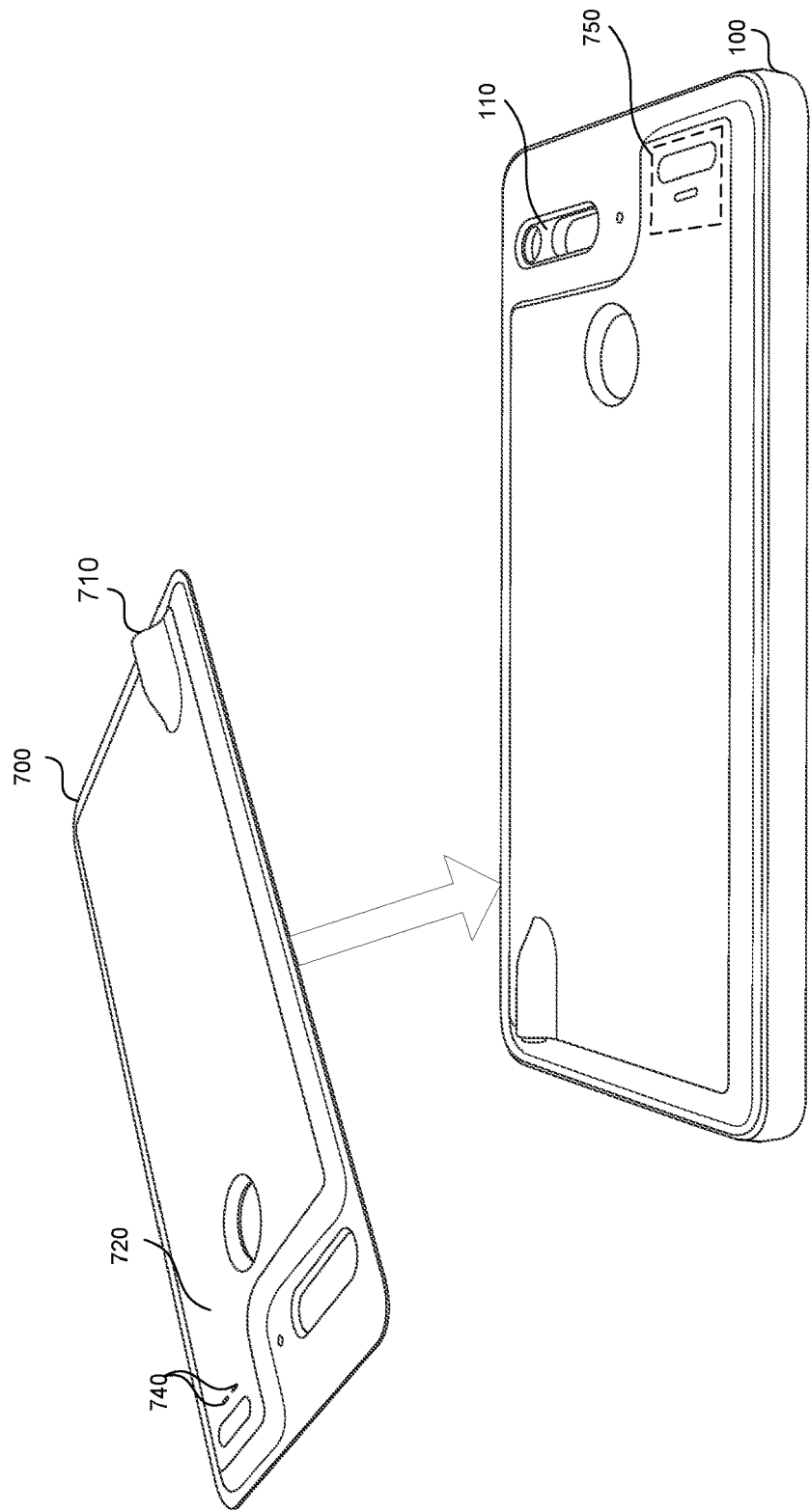
FIG. 7 shows an accessory providing an additional function to the electronic device, according to another embodiment.

FIG. 7 shows an accessory providing an additional function to the electronic device, according to another embodiment. The detachable member 700 attaches to the electronic device 110 and/or the member 100 and contains an accessory 710 which provides additional function to the electronic device 110. In the present case, the additional function provided is an electronic additional function. In particular, the additional functional is an external port 710. The port 710 can be an audio port such as a 3.5 mm port, 2.5 mm port, a microphone port, a TOSLINK port, a charging port, a camera, etc. As can be seen from FIG. 7, the body 720 of the detachable member 700 can protrude from the detachable member 700, and contain internal electronics such as a digital-to-analog converter, a battery, wires connecting the accessory 710 to the electronic device 110, etc. A single detachable member 700 can contain multiple accessories.

The accessory 710 can communicate with the electronic device 110 using wired or wireless communication. When the communication is wired, the detachable member 700 contains wires inside the body 720, and electric outputs 740 connecting to the corresponding recesses, such as recesses 370, 380 in FIG. 3B, on the electronic device 110.

When the communication between the accessory 710 in the electronic device 110 is wireless, the accessory 710 can communicate with the electronic device 110 using Bluetooth, wireless USB, and/or extremely high frequencies. The accessory 710 can be positioned anywhere on the detachable member 700, for example, at the edge, as shown in FIG. 7, in the middle, in a corner, etc. When the communication uses extremely high frequencies, the accessory 710 can be positioned precisely above a predefined region, such as a region 750 of the electronic device 110. The region 750 contains a wireless transceiver in communication with the accessory 710. The accessory 710 can be positioned precisely above the wireless transceiver to minimize scattering of the extremely high frequencies traveling through the chassis of the electronic device 110 and/or the chassis of the detachable member 700.

Figure 8:
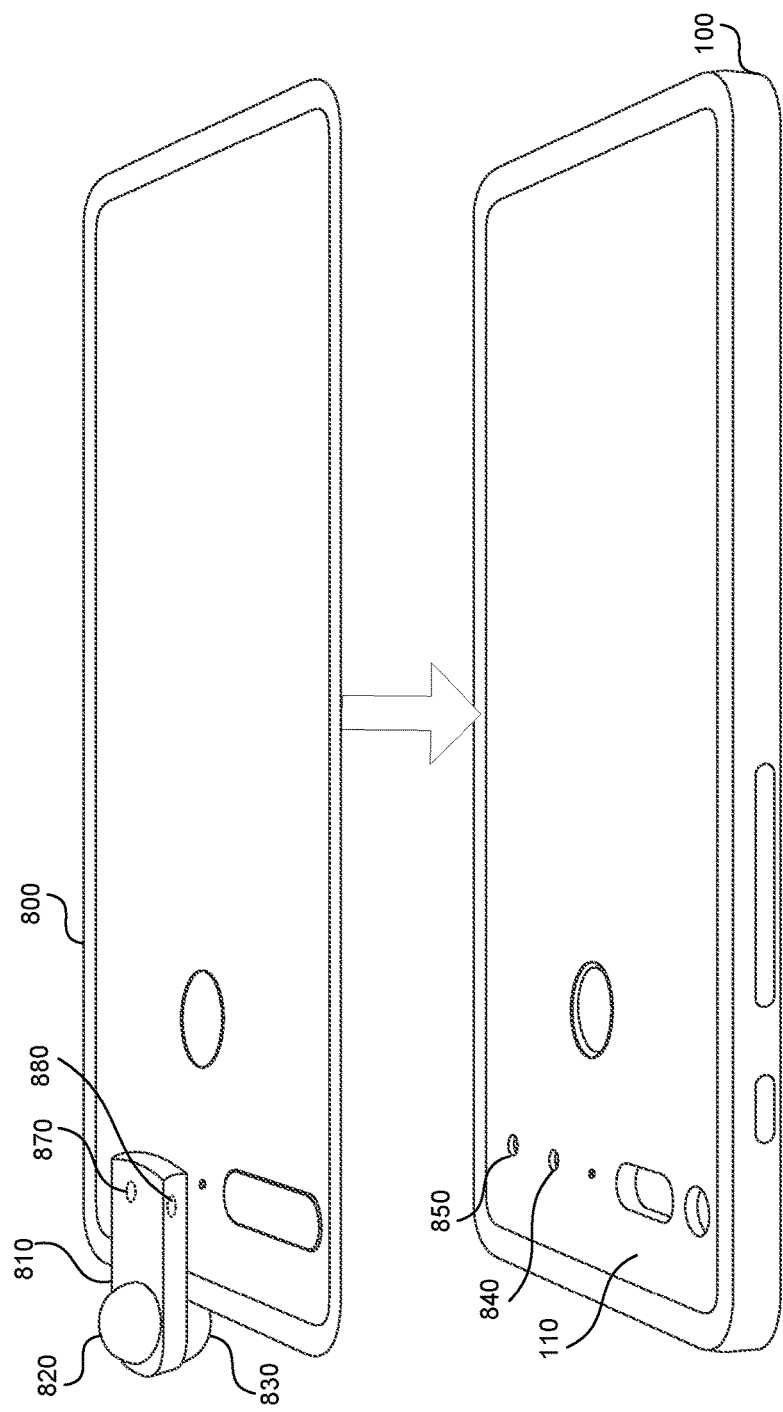
FIG. 8 shows an accessory providing an additional function to the electronic device, according to another embodiment.

FIG. 8 shows an accessory providing an additional function to the electronic device, according to another embodiment. The detachable member 800 attaches to the electronic device 110 and/or the member 100, and contains an accessory 810 which provides additional function to the electronic device 110. In the present case, the additional function provided is an electronic additional function. In particular, the additional functional is a two-sided camera 810 containing two lenses 820, 830. The lenses 820, 830 can be fisheye lenses, wide-angle lenses, normal lenses, portrait lenses, etc. Accessory 810 can be detachable from the detachable member 800, or the accessory can be integrated into the detachable member 800.

The camera 810 has to communicate a high amount of information, such as the recorded video information, to the electronic device 110. The camera 810 can communicate to the electronic device 110 using wired or wireless communication. When the communication is wired, the camera 810 can have access to the recesses 840, 850 on the electronic device 110 and use the recesses 840, 850 to communicate to the electronic device 110. The camera 810 can have access to the recesses 840, 850 through holes and/or flaps disposed on the detachable member 800.

When the communication between the camera 810 and electronic device 110 is wireless, the camera can use extremely high frequencies between 30 GHz to 300 GHz to communicate to the electronic device 110. The camera 810 can use the extremely high frequencies because the amount of data the camera 810 has to communicate requires a high bandwidth. At such high frequencies, the scattering is governed by the Mie scattering model. According to Mie scattering, all wavelengths scatter equally, and the greater the particle size, the more scattering occurs in the forward direction. Therefore, the camera 810 must be positioned precisely to minimize the amount of chassis material the extremely high frequencies waves have to travel through to reach a transceiver inside the electronic device 110. To precisely position the camera 810, protrusions 860, 870 mate with the recesses 840, 850 to secure the camera 810 to the electronic device 110.

The detachable member can include multiple accessories. The multiple accessories can be a combination of electrical accessories and mechanical accessories. For example, a single protective part can contain a camera 810 and a pocket 410. Examples of the accessories described in this application are not limiting. In addition to the accessories described in this application, the detachable member can contain various other accessories such as a solar cell, an additional display, a tripod, a hand strap, etc. disposed on the backside of the protective part. For example, the solar cell can be a flexible solar cell and/or a sticker solar cell that can be added to the detachable member already containing an accessory. The solar cells can be deposited on paper or on polyethylene terephthalate.

Figure 9:
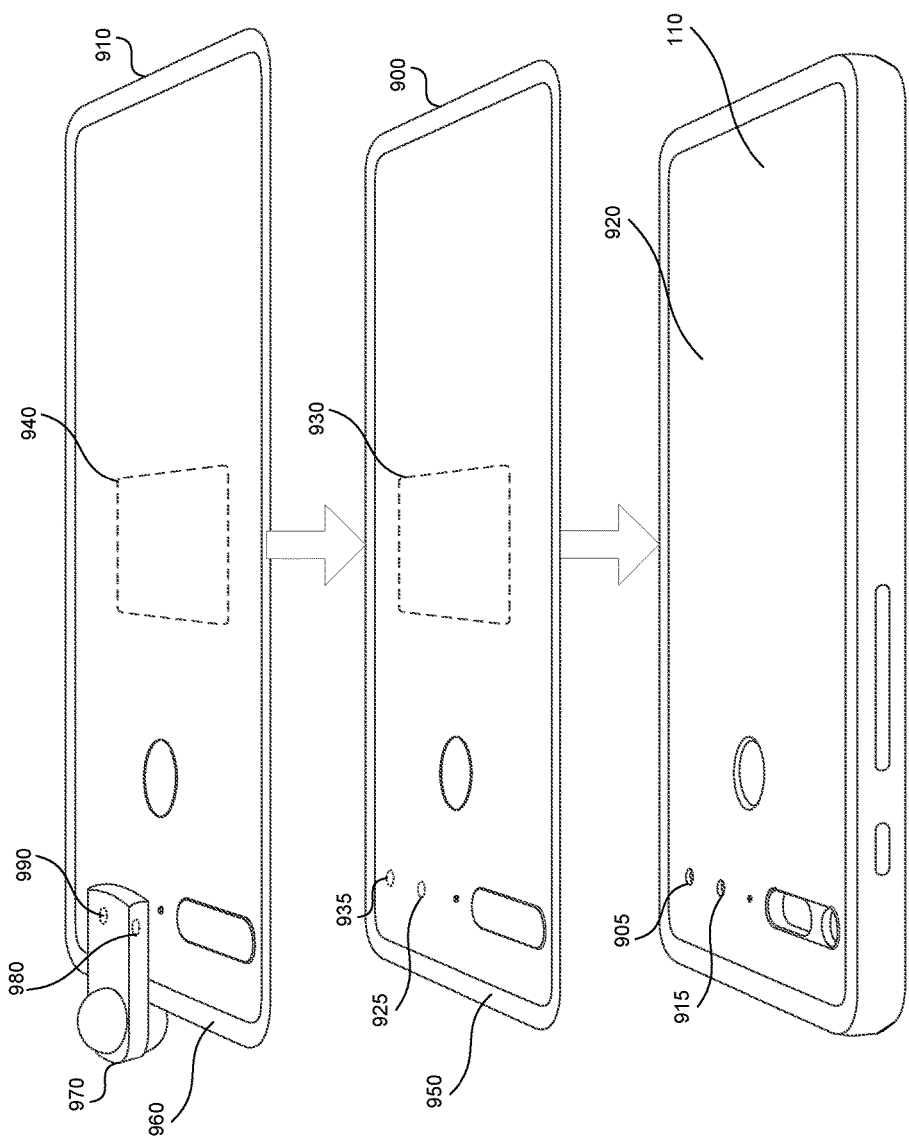
FIG. 9 shows multiple detachable members attached to a single electronic device.

FIG. 9 shows multiple detachable members attached to a single electronic device. Detachable members 900, 910 can be stacked on top of each other and attach to the single electronic device 110. Further, detachable members 900 and 910, instead of stacking on top of each other, can complement each other, like a puzzle or a mosaic, to cover the backside 920 of the electronic device 110.

For example, the detachable member 900 can include a second attachment mechanism 930 enabling a second detachable member 910 to attach to the detachable member 900. The second attachment mechanism 930 can be a magnet or magnetic material attaching to a corresponding attachment mechanism 940, such as a magnetic material or a magnet in the second detachable member 910. The second attachment mechanism 930 can be disposed in arbitrary locations of the detachable member 900. For example, the second attachment mechanism 930 can be disposed in the middle of the detachable member 900, as shown in FIG. 9, or the second attachment mechanism 930 can be disposed along a perimeter 950 of the detachable member 900. Consequently, the corresponding attachment mechanism in the second detachable member 910 can be disposed in corresponding locations on the second detachable member 910, such as in the middle of the second detachable member 910 as shown in the corresponding attachment mechanism 940, or along the perimeter 960 of the second detachable member 910. The second attachment mechanism 930 and the corresponding attachment mechanism 940 can be a recess, a protrusion, a magnet, a magnetic material, etc.

The detachable member 900 provides an additional function to the electronic device 110, while the second detachable member 910 provides a second additional function to the electronic device 110. The detachable member 900 can provide an additional function such as a mechanical or an electrical function. As shown in FIG. 9, the detachable member 900 can provide insulation to the electronic device 110. In addition, the detachable member 900 can contain an accessory. As shown in FIG. 9, the second detachable member 910 provides a camera 970 as an accessory to the electronic device 110.

The accessories associated with the detachable members 900, 910 do not interfere with each other. The accessory 970 of the second detachable member 910 can communicate with the electronic device 110 using wired or wireless communication, as described in this application. When the communication is wired, electric contacts 980, 990 of the accessory 970 can reach the electric contacts 905, 915 of the electronic device 110 through openings 925, 935.

Figure 10:
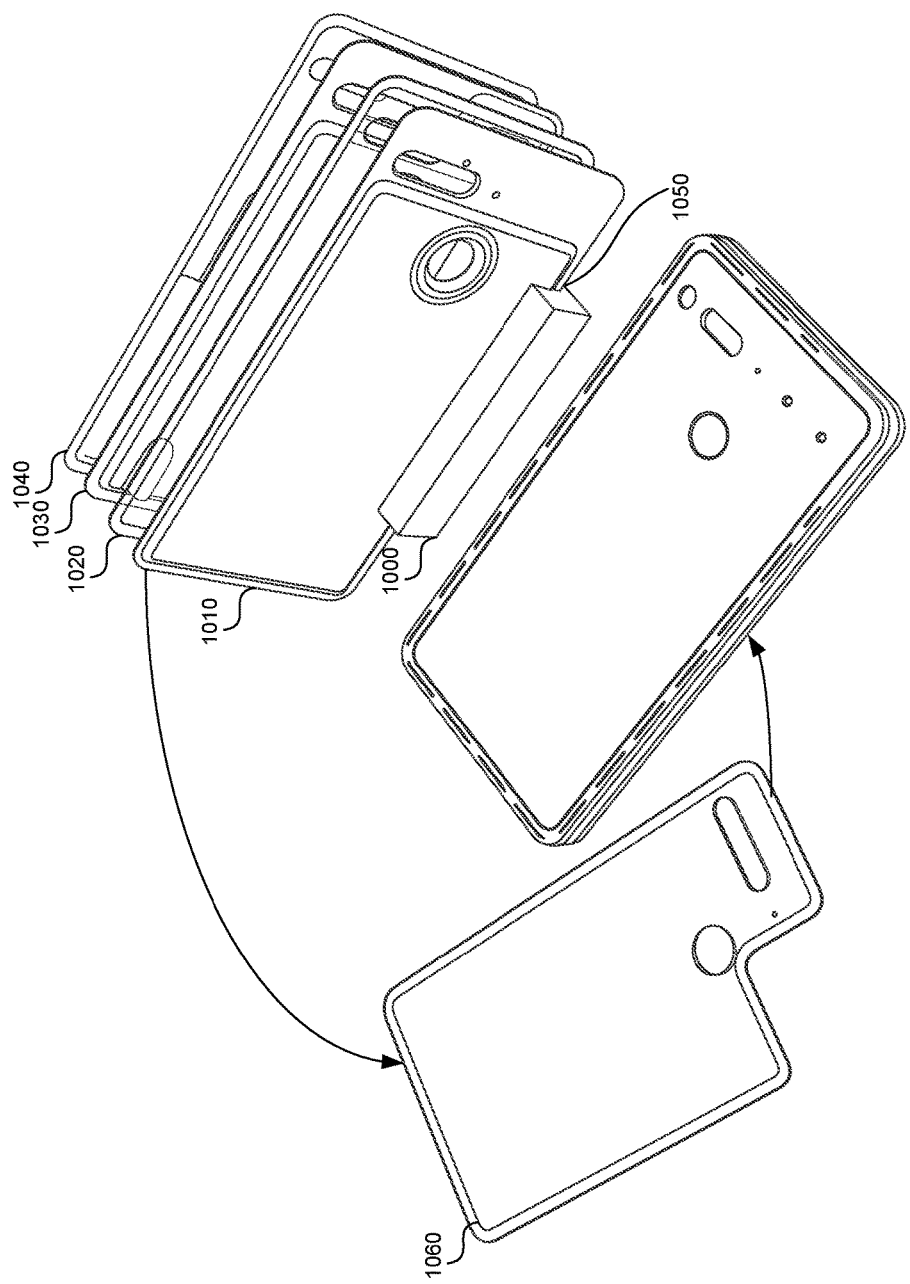
FIG. 10 shows an organizing member securing multiple detachable members.

FIG. 10 shows an organizing member securing multiple detachable members. The organizing member 1000 holds multiple detachable members 1010, 1020, 1030, 1040 in place, and enables the user to retrieve one or more detachable members 1060 at a time. The holding mechanism 1050 can be a recess corresponding to the width of a single detachable member 1010, 1020, 1030, 1040. The recess securely holds the single detachable member and enables the user to turn the organizing member 1000 upside down, without the organizing member 1000 losing the grip on the detachable members 1010, 1020, 1030, 1040. The width of the recesses can vary depending on the width of the detachable member 1010, 1020, 1030, 1040. In addition, the recess can include a clamp that can lock onto the detachable member 1010, 1020, 1030, 1040, and release the grip as the detachable member 1010, 1020, 1030, 1040 is pulled out of the organizing member 1000. The detachable members 1010, 1020, 1030, 1040 can be optically opaque or optically transparent. For example, the detachable member 1020 is optically transparent.

Figure 11:
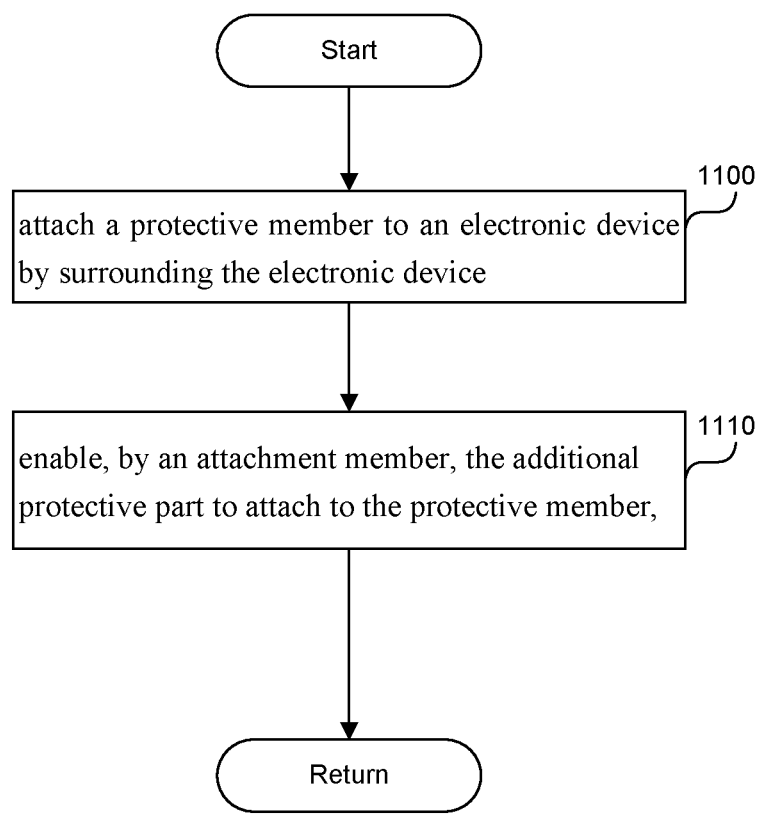
FIG. 11 is a flowchart of a method to attach a multiple part electronic device case to an electronic device.

FIG. 11 is a flowchart of a method to attach a multiple-part electronic device case to an electronic device. In step 1100, a member is attached to an electronic device by surrounding the electronic device. The member can define a region operable to receive a detachable member. The member and the detachable member define a modular electronic device case, such as a cell phone case, camera case, tablet case, etc. the member can include an attachment mechanism formed on the member.

In step 1110, the attachment mechanism enables the detachable member to attach to the member and/or the electronic device. The member can be attached to a perimeter of the electronic device, e.g., the perimeter of the electronic device including narrow sides of the electronic device. The member and the detachable member can substantially enclose the electronic device and prevent damage to the electronic device. The attachment mechanism can be disposed on the electronic device and/or on the member. The attachment mechanism can be at least one of a magnet, a magnetic material, a protrusion, a recess, Velcro, a clamp, etc. to receive a corresponding attachment mechanism associated with the detachable member.

The multipurpose electronic device case provides an additional function to the electronic device, such as protecting the electronic device from damage in a fall, or preventing harmful substances, such as water, from reaching the electronic device. In addition, the multipurpose electronic device case can include an accessory to be attached to the member and/or attached to the detachable member. The accessory can include a camera, a battery, a light, an audio port, a digital-to-analog converter, a solar cell, a mechanism to attach the electronic device to an external surface, a pocket, an additional display, a tripod, a hand strap etc.

The additional function can be provided to the electronic device by attaching the detachable member, including the accessory wirelessly communicating with the electronic device. The accessory can use Bluetooth, wireless USB frequencies, or extremely high frequencies in the 30 GHz to 300 GHz range. When the accessory uses the extremely high frequencies, the accessory is secured at a predefined location of the electronic device so as to minimize the scattering of the extremely high electromagnetic frequencies traveling through the chassis of the electronic device. The extremely high frequencies are subject to the Mie scattering, where the longer the path that the extremely high frequencies have to travel through the chassis of the electronic device, the higher the scattering. As a result, the thickness of the chassis can be reduced in the region through which the extremely high frequencies travel to reach a transceiver housed inside the electronic device.

A second detachable member can be attached to the detachable member. The member, the detachable member, and the second detachable member substantially enclose the electronic device. The second detachable member can also attach to the electronic device. The second detachable member can also provide a second additional function to the electronic device. For example, the detachable member can include a battery, while the second detachable member can include a solar cell.

In cases where the detachable member and the second detachable member cannot be combined, the attachment mechanism of the detachable member cannot connect to the attachment mechanism of the second detachable member. For example, when the detachable member contains a solar cell, the second detachable members which covers the solar cell cannot be attached to the detachable member because, for example, the magnets and/or magnetic materials are disposed in disparate regions of the detachable member and the second detachable member. In another example, the recesses in the protrusions of the two detachable members do not match in size.

The detachable member does not necessarily cover the full side of the electronic device. For example, the detachable member can be formed into a shape exposing a predefined location of the electronic device. Also, the detachable member can be formed into a shape to expose a predefined area of a primary detachable member. Specifically, the detachable member can be mounted on top of the primary detachable member containing a solar cell, and the detachable member is shaped to expose the solar cell of the primary detachable member disposed beneath the detachable member.

An organizing member can secure multiple detachable members, and dispense one or more detachable member to a user. The organizing member can contain various attachment mechanisms to hold the multiple detachable members in place, such as recesses corresponding to the thickness of a detachable member, clamps, magnets, etc.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus comprising:
a unitary member formed in a shape of a narrow, closed ribbon conforming and securing around a perimeter of an electronic device, the unitary member comprising an attachment mechanism disposed along a perimeter of the unitary member, the unitary member exposing a magnetic member to secure a detachable member to the electronic device; and
the detachable member comprising an accessory communicating wirelessly with the electronic device, the detachable member comprising a corresponding attachment mechanism disposed along a perimeter of the detachable member and securing the detachable member to the attachment mechanism of the unitary member, the unitary member and the detachable member substantially enclosing the electronic device.

2. The apparatus of claim 1, the accessory comprising at least one of a camera, a battery, a light, an audio port, a digital to analog converter, a display, or a solar cell.

3. The apparatus of claim 1, the detachable member securing the accessory at a predefined location of the electronic device and enabling wireless communication at extremely high frequencies comprising 30 GHz to 300 GHz by minimizing scattering of the extremely high electromagnetic frequencies traveling through the electronic device.

4. The apparatus of claim 1, the attachment mechanism comprising at least one of a magnet, a magnetic material, a protrusion, or a recess to receive the detachable member.

5. The apparatus of claim 1, the perimeter of the electronic device comprising narrow sides of the electronic device.

6. The apparatus of claim 1, the detachable member comprising a second attachment mechanism enabling a second detachable member to attach to the detachable member.

7. The apparatus of claim 1, the detachable member providing an additional function to the electronic device and comprising a second attachment mechanism enabling a second detachable member to attach to the detachable member, the second detachable member providing a second additional function to the electronic device, when attached the detachable member and the second detachable member providing the additional function in the second additional function to the electronic device.

8. The apparatus of claim 1, the detachable member formed into a shape exposing a predefined location of the electronic device.

9. An apparatus comprising:
a unitary member formed in a shape of a narrow, closed ribbon that securely conforms to and substantially surrounds a perimeter of an electronic device having a display so that the display of the electronic device remains viewable by a user, the unitary member having a shape corresponding to the perimeter of the electronic device, the unitary member exposing a magnetic member to secure a detachable member, and the unitary member further comprising an attachment mechanism formed thereon with which the detachable member is securely and removably attached to the electronic device.

10. The apparatus of claim 9, the detachable member comprising an accessory providing an additional function to the electronic device.

11. The apparatus of claim 10, the accessory comprising at least one of a camera, a battery, a light, an audio port, a digital to analog converter, a solar cell, a mechanism to attach the electronic device to an external surface, an additional display, a tripod, a hand strap, or a pocket.

12. The apparatus of claim 10, the accessory wirelessly communicating with the electronic device.

13. The apparatus of claim 10, the detachable member securing the accessory at a predefined location of the electronic device and enabling wireless communication at extremely high frequencies comprising 30 GHz to 300 GHz by minimizing scattering of the extremely high electromagnetic frequencies traveling through the electronic device.

14. The apparatus of claim 9, the attachment mechanism disposed along a perimeter of the unitary member and comprising at least one of a magnet, a magnetic material, a protrusion, or a recess to receive the detachable member.

15. The apparatus of claim 9, the unitary member attaching to the perimeter of the electronic device, the perimeter of the electronic device comprising narrow sides of the electronic device.

16. The apparatus of claim 9, the detachable member comprising a second attachment mechanism enabling a second detachable member to attach to the detachable member.

17. The apparatus of claim 9, the detachable member providing an additional function to the electronic device and comprising a second attachment mechanism enabling a second detachable member to attach to the detachable member, the second detachable member providing a second additional function to the electronic device, when attached the detachable member and the second detachable member providing the additional function in the second additional function to the electronic device.

18. The apparatus of claim 9, the detachable member shaped to expose a predefined location of the electronic device.

19. The apparatus of claim 9, comprising an organizing member securing a plurality of detachable members and dispensing at least one detachable member in the plurality of detachable members.

20. A method comprising:
attaching a unitary member formed in a shape of a narrow, closed ribbon to an electronic device by surrounding a perimeter the electronic device, the unitary member comprising an attachment mechanism formed thereon, the unitary member exposing a magnetic member to secure a detachable member; and
enabling, by the attachment mechanism, the detachable member comprising a corresponding attachment mechanism to attach to the unitary member, the unitary member and the detachable member substantially enclosing the electronic device when secured to the electronic device.

21. The method of claim 20, comprising providing an additional function to the electronic device by attaching the detachable member including an accessory.

22. The method of claim 21, said providing the additional function comprising attaching the accessory comprising a camera, a battery, a light, an audio port, a digital to analog converter, a solar cell, a mechanism to attach the electronic device to an external surface, a pocket, a display, a tripod, or a hand strap.

23. The method of claim 21, said providing the additional function comprising attaching the detachable member including the accessory wirelessly communicating with the electronic device.

24. The method of claim 21, comprising:
securing, by the detachable member, the accessory at a predefined location of the electronic device; and
enabling wireless communication at extremely high frequencies comprising 30 GHz to 300 GHz by minimizing scattering of the extremely high electromagnetic frequencies traveling through the electronic device.

25. The method of claim 20, the attachment mechanism comprising at least one of a magnet, a magnetic material a protrusion, or a recess to receive the detachable member.

26. The method of claim 20, the perimeter of the electronic device comprising narrow sides of the electronic device.

27. The method of claim 20, comprising attaching a second detachable member to the detachable member, wherein the unitary member, the detachable member, and the second detachable member substantially enclose the electronic device.

28. The method of claim 20, comprising:
providing an additional function to the electronic device by attaching the detachable member including an accessory; and
providing a second additional function to the electronic device by attaching a second detachable member to the detachable member, wherein the unitary member, the detachable member, and the second detachable member substantially enclose the electronic device.

29. The method of claim 20, comprising attaching the detachable member formed into a shape exposing a predefined location of the electronic device.

30. The method of claim 20, comprising:
securing, by an organizing member, a plurality of detachable members; and
dispensing, by the organizing member, at least one detachable member in the plurality of detachable members.

* * * * *